(12) United States Patent
Mallis et al.

(10) Patent No.: US 8,984,734 B2
(45) Date of Patent: Mar. 24, 2015

(54) STEP-TO-STEP WEDGE THREAD CONNECTIONS AND RELATED METHODS

(71) Applicant: Hydril Company, Houston, TX (US)

(72) Inventors: David Llewellyn Mallis, The Woodlands, TX (US); Gary Wayne Ward, Conroe, TX (US)

(73) Assignee: Hydril Company, Houston, TX (US)

( * ) Notice: Subject to any disclaimer, the term of this patent is extended or adjusted under 35 U.S.C. 154(b) by 51 days.

(21) Appl. No.: 13/861,131

(22) Filed: Apr. 11, 2013

(65) Prior Publication Data

US 2013/0219686 A1  Aug. 29, 2013

Related U.S. Application Data

(60) Division of application No. 13/310,241, filed on Dec. 2, 2011, now Pat. No. 8,496,274, which is a continuation of application No. 12/890,290, filed on Sep. 24, 2010, now abandoned.

(51) Int. Cl.
  *B23P 11/00*  (2006.01)
  *F16L 15/00*  (2006.01)
  *F16L 15/06*  (2006.01)

(52) U.S. Cl.
  CPC ............. *B23P 11/00* (2013.01); *F16L 15/002* (2013.01); *F16L 15/06* (2013.01)
  USPC ........................................................ 29/456

(58) Field of Classification Search
  USPC ............ 29/456, 428, 506; 285/333–334, 355, 285/390
  See application file for complete search history.

(56) References Cited

U.S. PATENT DOCUMENTS

| | | |
|---|---|---|
| 3,050,318 A | 8/1962 | Van Der Wissel |
| 3,359,013 A | 12/1967 | Knox et al. |
| RE30,647 E | 6/1981 | Blose |
| 4,570,982 A | 2/1986 | Blose et al. |
| 4,582,348 A | 4/1986 | Dearden et al. |
| 4,629,222 A | 12/1986 | Dearden et al. |
| 4,629,223 A | 12/1986 | Dearden et al. |
| 4,662,659 A | 5/1987 | Blose et al. |
| 4,703,954 A | 11/1987 | Ortloff et al. |
| RE34,467 E | 12/1993 | Reeves |
| 5,454,605 A | 10/1995 | Mott |
| 6,155,613 A | 12/2000 | Quadflieg et al. |
| 6,206,436 B1 | 3/2001 | Mallis |
| 6,270,127 B1 | 8/2001 | Enderle |
| 6,530,607 B1 | 3/2003 | Mallis et al. |

(Continued)

FOREIGN PATENT DOCUMENTS

EP  767335 A1  4/1997

OTHER PUBLICATIONS

International Search Report and Written Opinion issued in corresponding International Application No. PCT/US2011/052471; Dated Jun. 19, 2012 (12 pages).

*Primary Examiner* — John C Hong
(74) *Attorney, Agent, or Firm* — Osha Liang LLP

(57) ABSTRACT

A threaded connection includes a pin member comprising a first pin step and a second pin step, and pin wedge threads disposed on each of the first and second pin steps and a box member comprising a first box step and a second box step, and box wedge threads disposed on each of the first and second box steps, wherein an axial separation of the first and second pin steps differs from an axial separation of the first and second box steps.

6 Claims, 8 Drawing Sheets

(56) References Cited

U.S. PATENT DOCUMENTS

| | | |
|---|---|---|
| 6,550,821 B2 | 4/2003 | DeLange et al. |
| 6,722,706 B2 | 4/2004 | Church |
| 7,452,007 B2 | 11/2008 | Hashem et al. |
| 2006/0145480 A1 | 7/2006 | Mallis et al. |
| 2008/0012322 A1 | 1/2008 | Reynolds |
| 2009/0058085 A1 | 3/2009 | Breihan et al. |

STEP-TO-STEP WEDGE THREAD CONNECTIONS AND RELATED METHODS

CROSS-REFERENCE TO RELATED APPLICATIONS

The present application is a divisional application and claims benefit under 35 U.S.C. §120 to U.S. patent application Ser. No. 13/310,241, filed Dec. 2, 2011, which is a continuation application, and thus claims benefit pursuant to 35 U.S.C. §120, of U.S. patent application Ser. No. 12/890,290 filed Sep. 24, 2010. The contents of those applications are incorporated herein by reference in their entireties.

BACKGROUND

1. Field of the Disclosure

Embodiments disclosed herein relate generally to threaded connections. More particularly, embodiments disclosed herein relate to two-step wedge thread connections and related methods of makeup.

2. Background Art

Casing joints, liners, drill pipe, and drill collars (collectively referred to as "tubulars") are often used in drilling, completing, and producing a well. Casing joints, for example, may be emplaced in a wellbore to stabilize a formation, to protect a formation against elevated wellbore pressures (e.g., wellbore pressures that exceed a formation pressure), and the like. Casing joints may be coupled in an end-to-end manner by threaded connections, welded connections, and other connections known in the art. The connections may be designed so as to form a seal between an interior of the coupled casing joints and an annular space formed between exterior walls of the casing joints and walls of the wellbore. The seal may be, for example, an elastomeric seal (e.g., an o-ring seal), a metal-to-metal seal formed proximate the connection, or similar seals known in the art. In some connections, seals are formed between the internal and external threads. Connections with this characteristic are said to have a "thread seal." As used herein, a "thread seal" means that a seal is formed between at least a portion of the internal thread on the box member and the external thread on the pin member.

It will be understood that certain terms are used herein as they would be conventionally understood where tubular joints are being connected in a vertical position along a central axis of the tubular members such as when making up a pipe string for lowering into a well bore. Thus, the term "load flank" designates the side wall surface of a thread that faces away from the outer end of the respective pin or box member on which the thread is formed and supports the weight (i.e., tensile load) of the lower tubular member hanging in the well bore. The term "stab flank" designates the side wall surface of the thread that faces toward the outer end of the respective pin or box member and supports forces compressing the joints toward each other such as the weight of the upper tubular member during the initial makeup of the joint or such as a force applied to push a lower tubular member against the bottom of a bore hole (i.e., compressive force). The term "face" of the box is the end of the box member facing outward from the box threads and the term "nose" of the pin is the end of the pin member facing outward from the threads of the connection. Upon makeup of a connection the nose of the pin is stabbed into and past the face of the box.

One type of thread commonly used to form a thread seal is a wedge thread. In FIGS. 1A and 1B, a connection 100 having a wedge thread is shown. "Wedge threads" are characterized by threads that increase in width (i.e., axial distance between load flanks 125 and 126 and stab flanks 132 and 131) in opposite directions on the pin member 101 and box member 102. Wedge threads are extensively disclosed in U.S. Pat. No. RE 30,647 issued to Blose, U.S. Pat. No. RE 34,467 issued to Reeves, U.S. Pat. No. 4,703,954 issued to Ortloff, and U.S. Pat. No. 5,454,605 issued to Mott, all assigned to the assignee of the present invention and incorporated herein by reference.

On the pin member 101, the pin thread crest 122 is narrow towards the distal end of the pin member 101 while the box thread crest 191 is wide. Moving along the axis 105 (from right to left), the pin thread crest 122 widens while the box thread crest 191 narrows. The rate at which the threads change in width along the connection is defined by a variable known as the "wedge ratio." As used herein, "wedge ratio," although technically not a ratio, refers to the difference between the stab flank lead and the load flank lead, which causes the width of the threads to vary along the connection. Furthermore, as used herein, a thread "lead" refers to the differential distance between a component of a thread on consecutive threads. As such, the "stab lead" is the distance between stab flanks of consecutive thread pitches along the axial length of the connection. In FIGS. 1A and 1B, the thread surfaces are tapered, meaning that the pin thread 106 increases in diameter from beginning to end while the box thread 107 decreases in diameter in a complimentary manner Having a thread taper improves the ability to stab the pin member 101 into the box member 102 and distributes stress in the connection.

For wedge threads, a thread seal is accomplished by the contact pressure caused by interference over at least a portion of the connection between the pin load flank 126 and the box load flank 125 and between the pin stab flank 132 and the box stab flank 131, which occurs when the connection is made-up. Close proximity or interference between the roots 192 and 121 and crests 122 and 191 completes the thread seal when it occurs over at least a portion of where the flank interference occurs. Higher pressure may be contained with increased interference between the roots and crests ("root/crest interference") on the pin member 101 and the box member 102 and by increasing flank interference. This particular connection also includes a metal-to-metal seal that is accomplished by contact between corresponding sealing surfaces 103 and 104 located on the pin member 101 and box member 102, respectively.

A property of wedge threads, which typically do not have a positive stop torque shoulder on the connection, is that the make-up is "indeterminate," and, as a result, the relative position of the pin member and box member varies more for a given torque range to be applied than connections having a positive stop torque shoulder. As used herein, "make-up" refers to threading a pin member and a box member together. A final make-up refers to threading the pin member and the box member together up to a desired amount of torque, or based on a relative position (axial or circumferential) of the pin member with the box member.

For wedge threads that are designed to have both flank interference and root/crest interference at a selected make-up, both the flank interference and root/crest interference increase as the connection is made-up (i.e. increase in torque increases flank interference and root/crest interference). For wedge threads that are designed to have root/crest clearance, the clearance decreases as the connection is made-up. Regardless of the design of the wedge thread, corresponding flanks and corresponding roots and crests come closer to each other (i.e. clearance decreases or interference decreases) during make-up.

Indeterminate make-up allows for the flank interference and root/crest interference to be increased by increasing the torque on the connection. Thus, a wedge thread may be able to thread seal higher pressures of gas and/or liquid by designing the connection to have more flank interference and/or root/crest interference or by increasing the torque on the connection; however, this also increases stress on the connection during make-up, which could lead to failure during use.

Prior to make-up a flowing joint compound commonly referred to as "pipe dope" is typically applied to surfaces of a threaded connection to improve the thread seals and provide lubrication during make-up of the connection. For example, the base (e.g., a grease) of the pipe dope may assist a wedge-threaded connection in achieving a thread seal between load and stab flanks thereof, e.g., as disclosed in U.S. Pat. No. RE 34,467 issued to Reeves. Further, pipe dope may contain metallic particle additives, such as copper to protect the threads of the pin and box members from friction galling during make-up and break-out.

When a wedge thread connection is made-up, excess pipe dope may become trapped (rather than being squeezed out) between engaging pin and box threads, which may either cause false elevated torque readings (leading to insufficient make-up or "stand-off") or, in certain circumstances, damage the connection. Pipe stand-off due to inadequate evacuation of the pipe dope is detrimental to the structural integrity of wedge thread connections. As the pressure build-up may bleed off during use, the connection is at risk of accidentally backing off during use. Therefore, stand-off in wedge thread connections is of particular concern as it may lead to loss of seal integrity or even mechanical separation of the two connected members.

FIG. 2 shows a prior art two-step connection 150. The threads that form the connection are separated on two different "steps," a large step indicated by the bracket 31 and a small step indicated by the bracket 32. The portion between the large step 31 and the small step 32 is commonly referred to as a mid-step 901. In some connections, the mid-step 901 may be used as a metal-to-metal seal. The pin thread crest 222 on the small step 32 of the pin member 101, at its full design height, does not interfere with the box thread crest 221 on the large step 31 of the box member 102 when the pin member 101 is stabbed into the box member 102. The diameter of the small step 32 of the pin member 101 is smaller than the smallest crest-to-crest thread diameter on the large step 31 of the box member 102. The pin thread 106 on the small step 32 can be stabbed past the box thread 107 on the large step 31. The threads on both the small step 32 and the large step 31, which have substantially the same nominal lead, engage with each revolution to make-up the connection. Thus, the number of revolutions during which the threads slide or rub against each other is reduced for the same number of engaged threads. A two-step connection allows for each of the steps to have threads with different characteristics as long there is little or no variance in the nominal lead of the threads on the steps.

A two-step wedge thread connection is disclosed in U.S. Pat. No. 6,206,436 issued to Mallis and assigned to the assignee of the present invention. That patent is incorporated herein by reference. Mallis discloses a two-step wedge thread connection having different wedge ratios, one of which is considered to be an "aggressive" wedge ratio and the other a "conservative" wedge ratio. "Aggressive" refers to the larger wedge ratio, and "conservative" refers to the smaller wedge ratio. Everything else the same, the greater the wedge ratio, the more determinate the make-up. Too large of a wedge ratio may have an inadequate wedging effect, which can allow the connection to back-off during use. Smaller wedge ratios are better able to resist backing-off of the connection. Too small of a wedge ratio may have such an indeterminate make-up that galling may occur over the lengthened make-up distance. Mallis discloses that one of the steps can have a wedge ratio that is optimized for a more determinate make-up (aggressive), while the other step can have a wedge ratio that is optimized for preventing back-off of the connection (conservative).

FIGS. 3A and 3B show cross-section views of a conventional two-step wedge thread connection 200 prior to a final makeup. The connection 200 includes a pin member 201 having pin wedge threads 106 thereon and a box member 202 having corresponding box wedge threads 107 thereon. Further, the connection 200 has first step 31 and second step 32, with a mid-step region 901 located therebetween. As shown, an axial separation of the two wedge thread steps 31, 32 of the pin member 201, indicated by distance 'B,' is substantially equal to an axial separation of the two wedge thread steps 31, 32 of the box member 202, indicated by distance 'A.' Thus, the pin wedge threads 106 on the first step 31 of the pin member 201 may be characterized as "in-phase" with the box wedge threads 107 on the first step 31 of the box member 202. Likewise, the pin wedge threads 106 on the second step 32 of the pin member 201 may be characterized as "in-phase" with the box wedge threads 107 on the second step 32 of the box member 202.

The corresponding pin and box threads on the two steps 31, 32 are in-phase such that during makeup, gaps 137 between approaching load flanks 125, 126 are equal to gaps 138 between approaching stab flanks 131, 132 on the first step 31. Similarly, gaps 137 between approaching load flanks 127, 128 are equal to gaps 138 between approaching stab flanks 133, 134 on the second step 32. Thus, corresponding load flanks 125, 126 and stab flanks 131, 132 on first step and corresponding load flanks 127, 128 and stab flanks 133, 134 on second step 32 will contact at substantially the same time (i.e., at final makeup). FIGS. 3C and 3D illustrate the conventional two-step wedge thread connection 200 at a final makeup. Because the corresponding load flanks 125, 126 and stab flanks 131, 132 on first step 31, and corresponding load flanks 127, 128 and stab flanks 133, 134 contact at substantially the same time, the interference generated between the surfaces is substantially equal.

A threaded connection having improved make-up and break-out torque characteristics would be appreciated by those skilled in the art.

SUMMARY OF THE DISCLOSURE

In one aspect, embodiments disclosed herein relate to a threaded connection including a pin member comprising a first pin step and a second pin step, and pin wedge threads disposed on each of the first and second pin steps and a box member comprising a first box step and a second box step, and box wedge threads disposed on each of the first and second box steps, wherein an axial separation of the first and second pin steps differs from an axial separation of the first and second box steps.

In other aspects, embodiments disclosed herein relate to a threaded connection including a pin member comprising a first pin step and a second pin step, and pin wedge threads disposed on each of the first and second pin steps and a box member comprising a first box step and a second box step, and box wedge threads disposed on each of the first and second box steps, wherein the pin wedge threads on at least one of the first and second pin steps and the corresponding box wedge threads on at least one of the first and second box steps are axially misaligned.

In other aspects, embodiments disclosed herein relate to a method of making up a threaded connection, the method including rotationally engaging a pin member having pin wedge threads with a box member having corresponding box wedge threads, wherein the pin and box wedge threads are formed on corresponding first and second pin and box steps of the pin and box members and engaging opposing pin and box stab and load flanks at different times during makeup of the threaded connection.

Other aspects and advantages of the invention will be apparent from the following description and the appended claims.

DETAILED DESCRIPTION

In one aspect, embodiments disclosed herein relate to threads for tubular connections. More particularly, embodiments disclosed herein relate to two-step connections having a step-to-step wedge by which increased interference is generated between opposing thread flanks at a final makeup of the connection.

Figure 1A:
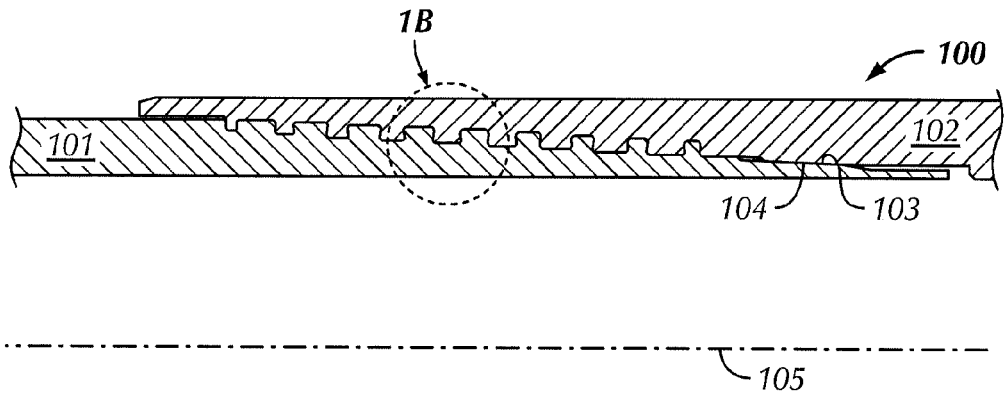
FIGS. 1A and 1B show a cross-section view of a prior art connection having a wedge thread.
Figure 1B:
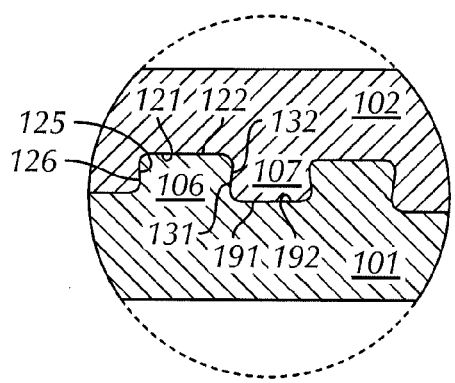
Figure 2:
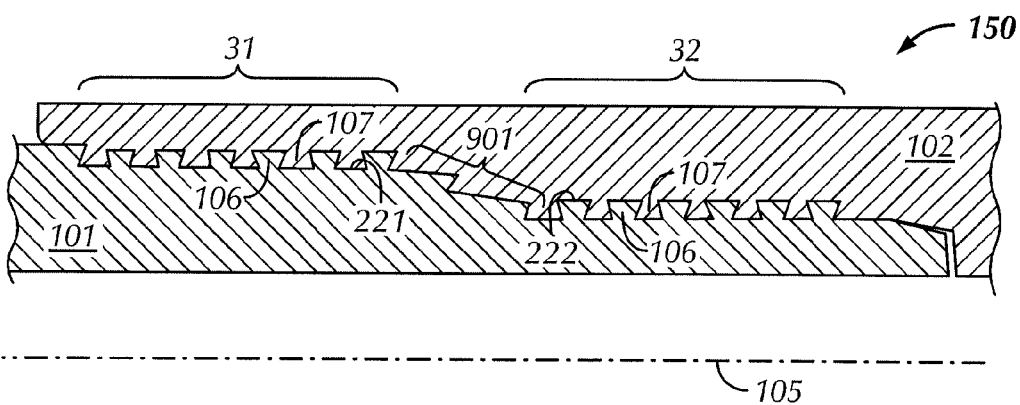
FIG. 2 shows a cross-section view of a prior art two-step threaded connection.
Figure 3A:
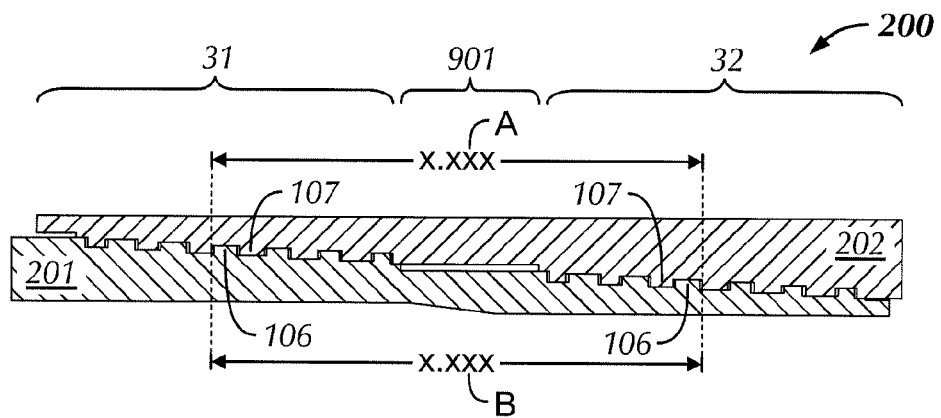
FIGS. 3A and 3B show cross-section and top views, respectively, of a prior art two-step wedge thread connection during makeup.
Figure 3B:
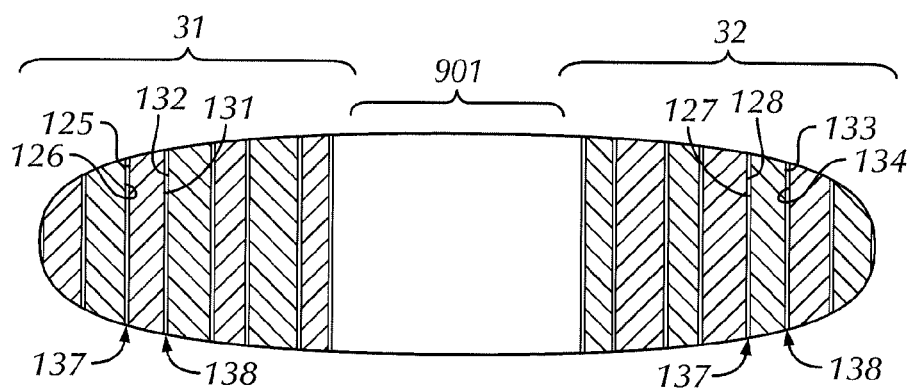
Figure 3C:
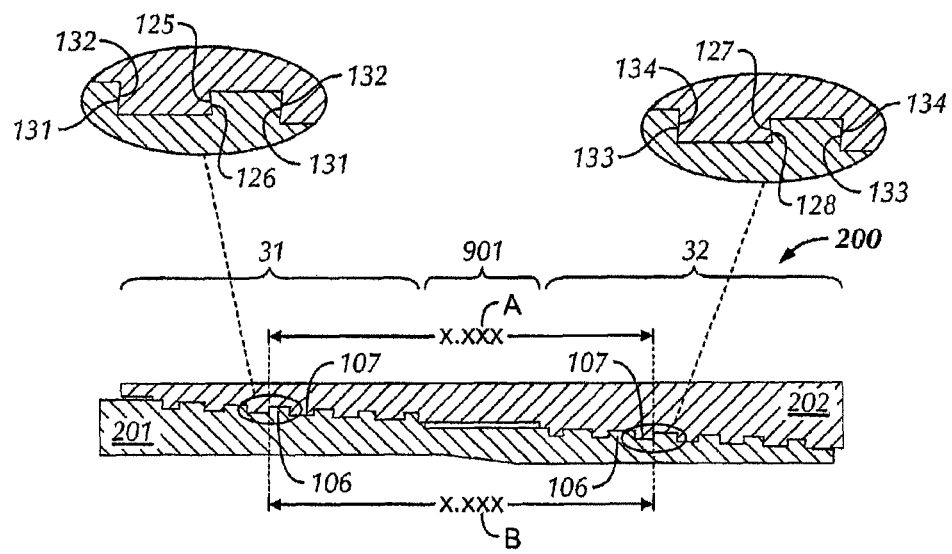
FIGS. 3C and 3D show cross-section and top views, respectively, of the prior art two-step wedge thread connection in FIGS. 3A and 3B at a final makeup.
Figure 3D:
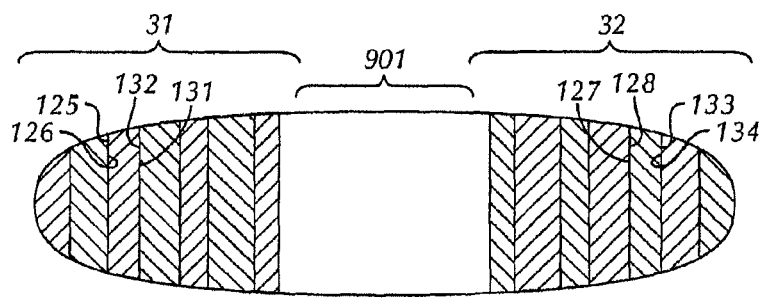
Figure 4A:
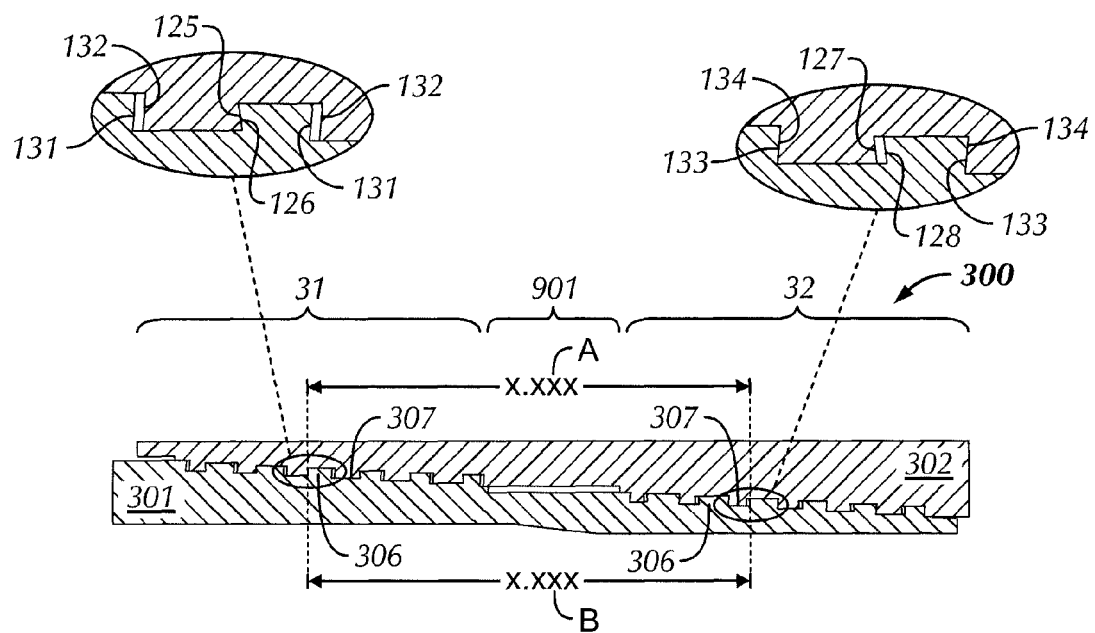
FIGS. 4A and 4B show cross-section and top views, respectively, of a reduced box step-to-step wedge thread connection during makeup in accordance with one or more embodiments of the present disclosure.

FIG. 4A shows a cross section of a two-step wedge thread connection 300 having a step-to-step wedge in accordance with one or more embodiments of the present disclosure. The connection 300 includes a pin member 301 having pin wedge threads 306 and a box member 302 having corresponding box wedge threads 307. The pin and box wedge threads 306, 307 may be configured having a dove-tailed profile. Further, the pin and box members 301, 302 each have corresponding first steps 31 and second steps 32 formed thereon and a mid-step region 901 located between corresponding steps 31, 32.

The connection 300 is configured such that an axial separation of the two wedge thread steps 31, 32 of the pin member 301, indicated by distance 'B,' differs from an axial separation of the two wedge thread steps 31, 32 of the box member 302, indicated by distance 'A.' Stated otherwise, an axial length of a mid-step region 901 located between steps 31, 32 of the pin member 301 may differ from an axial length of a mid-step region 901 located between steps 31, 32 of the box member 302. As such, the pin wedge threads 306 on the first step 31 of the pin member 301 may be characterized as "out-of-phase" with the corresponding box wedge threads 307 on the first step 31 of the box member 302. Likewise, the pin wedge threads 306 on the second step 31 of the pin member 301 may be characterized as "out-of-phase" with the corresponding box wedge threads 307 on the second step 32 of the box member 302.

As used herein, a connection having axial length differences between steps may be referred to as the step-to-step wedge. Distances A and B may be measured from any fixed coaxial locations on pin and box members from a first step 31 to a second step 32. As shown here, the coaxial locations on the pin and box members are corresponding pin and box thread flanks but those skilled in the art will understand other locations from which the distances may be measured.

In certain embodiments, distance A (i.e., axial separation of the two wedge thread steps 31, 32 of the box member 302) may be slightly less than distance B (i.e., axial separation of the two wedge thread segments 31, 32 of the pin member 301). In this instance, the two-step wedge thread connection 300 may be termed a "reduced box step-to-step wedge thread connection" because the axial separation, distance A, between steps 31, 32 of the box member 302 is reduced. As shown, distance A of the box member 302 is reduced by a specified amount (i.e., x.xxx inches–.xxx inches) from an amount of distance B (i.e., x.xxx inches) of the pin member 301. In certain embodiments, the difference in axial separation (i.e., .xxx inches) may be greater than zero or within a range of between about 0.0005 inches to about 0.015 inches. In other embodiments, the difference in axial separation may be about 0.003 inches.

Figure 4B:
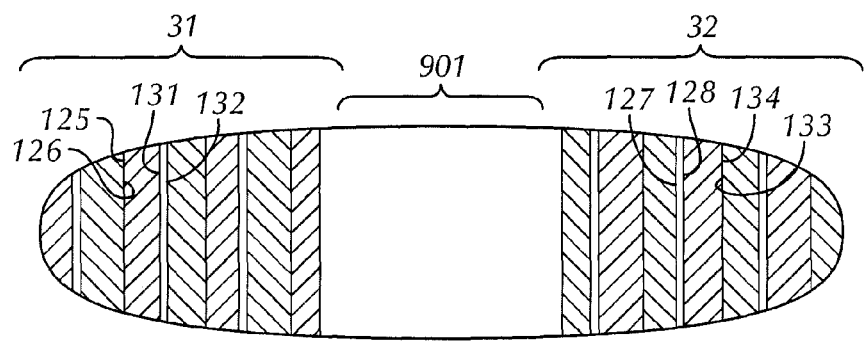

Referring now to FIG. 4B, a top view of engaging wedge threads on steps 31, 32 of connection 300 during makeup in accordance with one or more embodiments of the present disclosure is shown. Because of the reduced axial separation between steps 31, 32 of the box member 302, corresponding flanks on the two steps 31, 32 may engage at different times during makeup. In this case, on step 31, corresponding load flanks 125, 126 may engage prior to corresponding stab flanks 131, 132, while on step 32, corresponding stab flanks 133, 134 may engage prior to corresponding load flanks 127, 128.

Figure 4C:
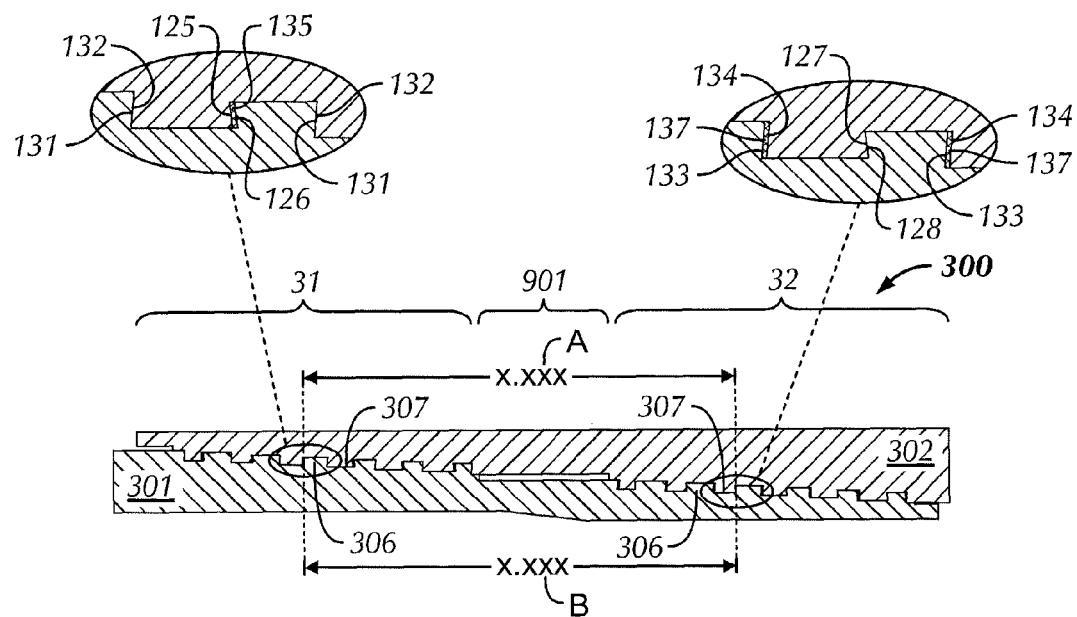
FIGS. 4C and 4D show cross-section and top views, respectively, of the reduced box step-to-step wedge thread connection of FIGS. 4A and 4B at a final makeup in accordance with one or more embodiments of the present disclosure.
Figure 4D:
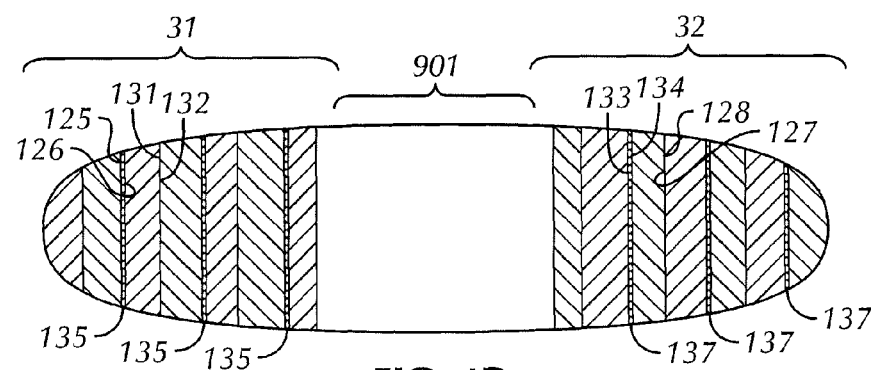

FIGS. 4C and 4D show the reduced box step-to-step wedge thread connection 300 of FIGS. 4A and 4B at a final makeup in accordance with one or more embodiments of the present disclosure. At final makeup, load flanks 125, 126 and stab flanks 131, 132 on the first step 31 and load flanks 127, 128 and stab flanks 133, 134 on the second step 32 are engaged. However, an amount of interference between engaged stab and load flanks differs. As such, on first step 31, a higher interference 135 (illustrated as overlap) is generated between load flanks 125, 126 than stab flanks 131, 132, while on the second step 32, a higher interference 137 (illustrated as overlap) is generated between stab flanks 133, 134 than load flanks 127, 128 due to the difference in axial separation between steps 31, 32 of the pin member 301 and box member 302. In certain embodiments, on step 31, load flanks 125, 126 may engage while stab flanks 131, 132 may not completely engage or engage at all, while on step 32, stab flanks 133, 134 may engage while load flanks 127, 128 may not completely engage or engage at all.

In certain embodiments with the reduced box step-to-step connection, a mid-seal may be formed in mid-step region 901 as corresponding metal surfaces of the pin and box members in the mid-step region 901 between steps 31, 32 may engage to form a metal-to-metal mid-seal. As shown in FIGS. 4C and 4D, the forces applied to the mid-step region 901 due to increased interference on outwardly facing flanks (or stated otherwise, flanks facing away from the mid-step region 901), i.e., load flanks 125, 126 on step 31 and stab flanks 133, 134 on step 32, further forces metal surfaces of the mid-seal to remain in contact due to a Poisson effect in the mid-seal region. In essence, due to the reduced box step-to-step wedge, tension is created in the box member causing a central portion (mid-step region 901) to "neck" inward (i.e., move radially inward). At the same time, due to the reduced box step-to-step wedge, compression is created in the pin member causing a central portion (mid-step region) 901 to "bow" outward (i.e., move radially outward). Thus, the corresponding inwardly necked central portion of the box member and the outwardly bowed central portion of the pin member cause a radial increased interference (due to the Poisson effect) between metal surfaces in the mid-step region 901 of the pin and box members.

The axial increased interference created in load flanks 125, 126 on the first step 31 and stab flanks 133, 134 on the second step 32 in the reduced box step-to-step wedge thread connection may cause a mid-step region 901 of the box member 302 to stretch at final makeup, effectively pre-tensioning the box member 302. In addition, a mid-step region 901 of the pin member 301 may be pre-compressed. By having pre-loaded members, i.e. a pre-tensioned box member 302 and a pre-compressed pin member 301 after makeup, the threaded connection 300 may be able to delay the reduction of the mid-seal increased interference that external compressive or tensile forces acting on the string may cause on the mid-seal. For example external tension forces acting on the connection may produce, in the mid-seal sealing surface of the pin member, a reduction of the interference contact stresses. However, the pre compression of the pin mid step region delays the effect of such external tensile forces, because the pre-compression needs to be first overcome by the external tensile force before the mid step region is affected. Similarly, external compression forces acting on the connection may produce, in the mid-seal sealing surface of the box member, a reduction of the interference contact stresses. However, the pre tension of the box mid step region delays the effect of such external compressive forces, because the pre-tension needs to be first overcome by the external compressive force before the mid step region is affected.

Wedge threads in combination with dovetail thread profiles may provide a radial interlocking effect, which locks the pin member and box member together radially and provides resistance against separation caused by internal or external pressure. In addition, the step-to-step wedge introduces a backup interlocking mechanism. If the standard wedge fails to provide such interlocking, the step-to-step wedge may provide additional resistance to the internal or external pressure and prevent radial separation of the pin and box members. In sum, embodiments disclosed herein provide a connection that obtains the trapping effect for the metal to metal seal in the central portion 901, from the step-to-step wedge, in combination with the interlocking effect of the dovetail thread profile in the individual steps. Moreover, even if the wedge thread of the individual steps would happen to fail, (due to, for example, standoff caused either by dope entrapment or by insufficient make up torque), the trapping or interlocking effect may still be provided by the step-to-step wedge. In certain embodiments, internal pressure support in the connection may be distributed approximately two-thirds to the box thickness at the mid-seal and one-third to the locking effect of the step-to-step wedge.

Figure 6:
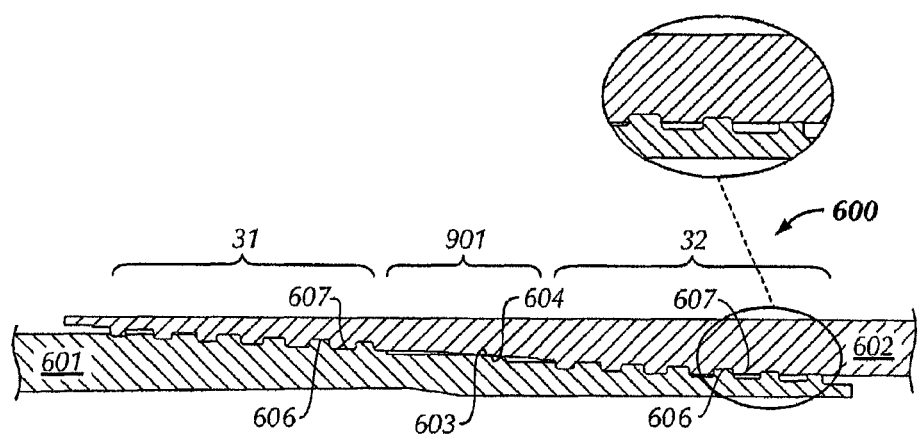
FIG. 6 shows a cross-section view of a two-step wedge thread connection having a vanishing box thread in accordance with one or more embodiments of the present disclosure.

Referring now to FIG. 6, a cross-section view of a two-step wedge thread connection 600 having the step-to-step wedge and also having a mid-seal in accordance with one or more embodiments of the present disclosure is shown. The pin member 601 and box member 602 having corresponding steps 31, 32 are engaged such that sealing surfaces 603 (of pin member 601) and 604 (of box member 602) engage. The sealing surfaces 603, 604 are established at assembly by metal-to-metal interference. Upon full make-up of the connection 600, engagement of the step-to-step wedge may induce additional radial positional interference into the contacting sealing surfaces 603, 604 (i.e., an "increased interference" effect). In addition to this, the pre-loading of pin and box members due to the step-to-step wedge may delay the reduction of the Poisson effect (i.e., the neck inward and bow outward mechanism) that compressive or tensile loads acting on the connection (i.e. forces transmitted by the pipe string) may produce. The seal pressure retention characteristic of the threaded connection 600 is related to the ability of the sealing surfaces 603, 604 to remain in contact with one another as radial deflection of the joint occurs from either internal pressure of external pressure. Seal retention of embodiments having a locked-in or trapped mid-seal result from a locking effect of the step-to-step wedge thereby preventing loss of surface contact between surfaces 603 and 604. The locking in effect causes the two surfaces 603 and 604 to deflect as one.

Methods of making up a reduced box step-to-step connection include engaging pin wedge threads 306 of pin member 301 with corresponding box wedge threads 307 of box member 302. During makeup, on step 31, corresponding load flanks 125, 126 may engage prior to corresponding stab flanks 131, 132, while on step 32, corresponding stab flanks 133, 134 may engage prior to corresponding load flanks 127, 128. As makeup of the connection continues, interference between load flanks 125, 126 on the first step 31 and stab flanks 133, 134 increases up to a final makeup. At final makeup, stab flanks 131, 132 on the first step 31 and load flanks 127, 128 on the second step 32 also engage. Thus, at final makeup, a higher interference 135 is generated between load flanks 125, 126 than stab flanks 131, 132, while on the second step 32, a higher interference 137 is generated between stab flanks 133, 134 than load flanks 127, 128.

Figure 5A:
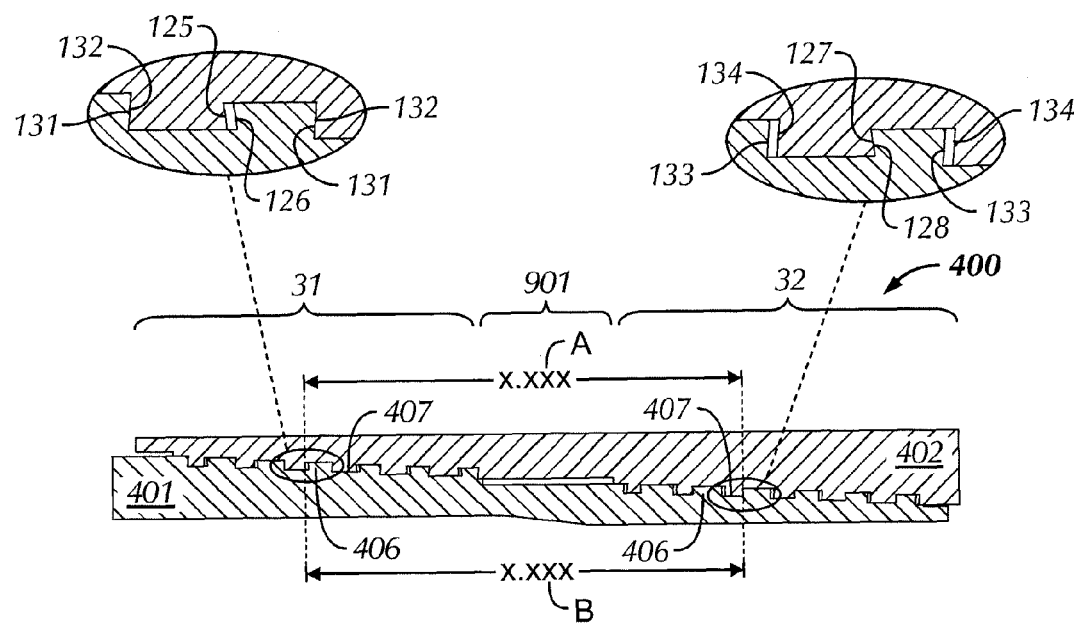
FIGS. 5A and 5B show cross-section and top views, respectively, of a reduced pin step-to-step wedge thread connection during makeup in accordance with one or more embodiments of the present disclosure.

Referring now to FIG. 5A, a cross section of a two-step wedge thread connection 400 having a step-to-step wedge in accordance with one or more embodiments of the present disclosure is shown. The connection 400 includes a pin member 401 having pin wedge threads 406 thereon and a box member 402 have box wedge threads 407 thereon. Further, the pin member 401 and box member 402 each have corresponding first steps 31 and second steps 32 formed thereon. A mid-step region 901 is located between corresponding steps 31, 32.

The connection 400 is configured such that a distance B (i.e., axial separation of the two wedge thread steps 31, 32 of the pin member 401) may be slightly less than distance A (i.e., axial separation of the two wedge thread segments 31, 32 of the box member 402). In this instance, the two-step wedge thread connection may be termed a "reduced pin step-to-step wedge thread connection" because the axial separation, distance B, between steps 31, 32 of the pin member 401 is reduced. As shown, distance B of the pin member 401 is reduced by a specified amount (i.e., x.xxx inches–.xxx inches) from a specified amount of distance A (i.e., x.xxx inches) of the box member 402. In certain embodiments, the difference in axial separation (i.e., .xxx inches) may be within a range of between about 0.0005 inches to about 0.015 inches. In other embodiments, the difference in axial separation may be about 0.003 inches.

Figure 5B:
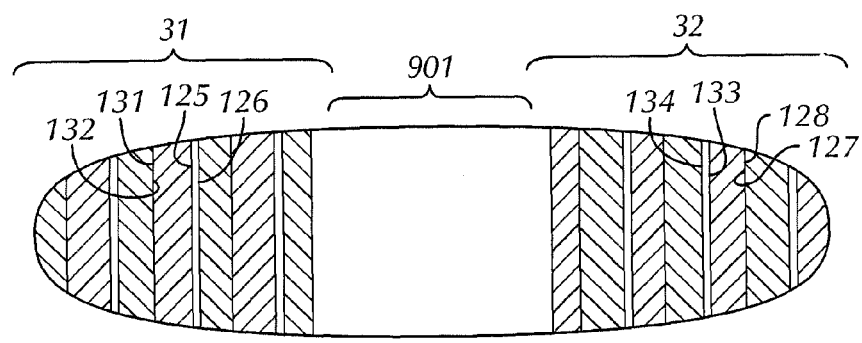

Referring now to FIG. 5B, a top view of engaging threads on steps 31, 32 of connection 400 during makeup in accordance with one or more embodiments of the present disclosure is shown. Because of the reduced axial separation between steps 31, 32 of the pin member 401, corresponding flanks on the two steps 31, 32 may engage at different times during makeup. In this case, on step 31, corresponding stab flanks 131, 132 may engage prior to corresponding load flanks 125, 126, while on step 32, corresponding load flanks 127, 128 may engage prior to corresponding stab flanks 133, 134.

Figure 5C:
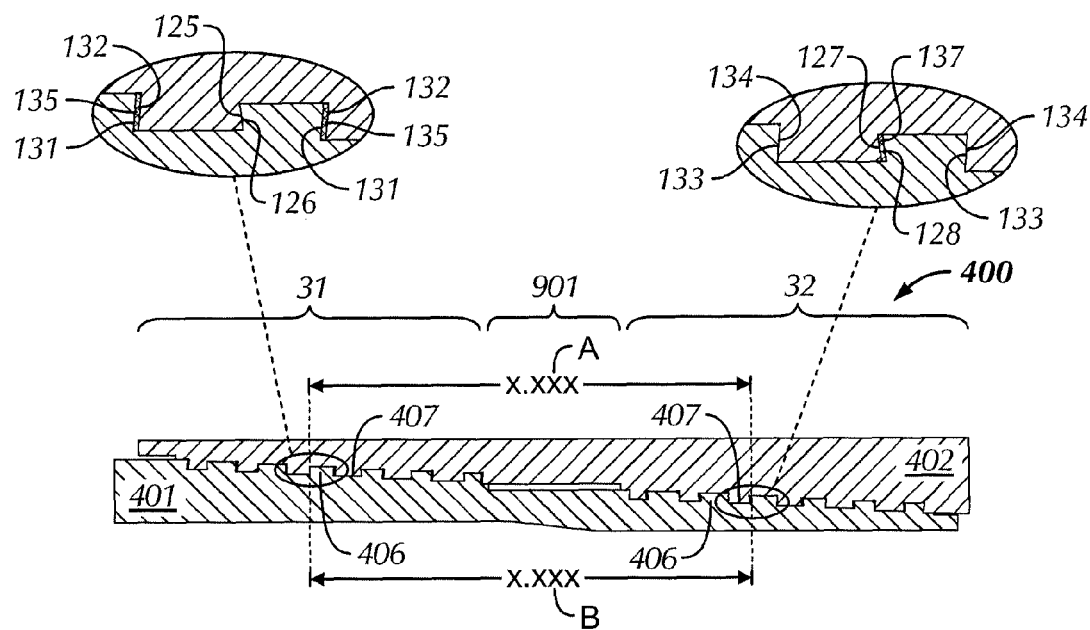
FIGS. 5C and 5D show cross-section and top views, respectively, of the reduced pin step-to-step wedge thread connection of FIGS. 5A and 5B at a final makeup in accordance with one or more embodiments of the present disclosure.
Figure 5D:
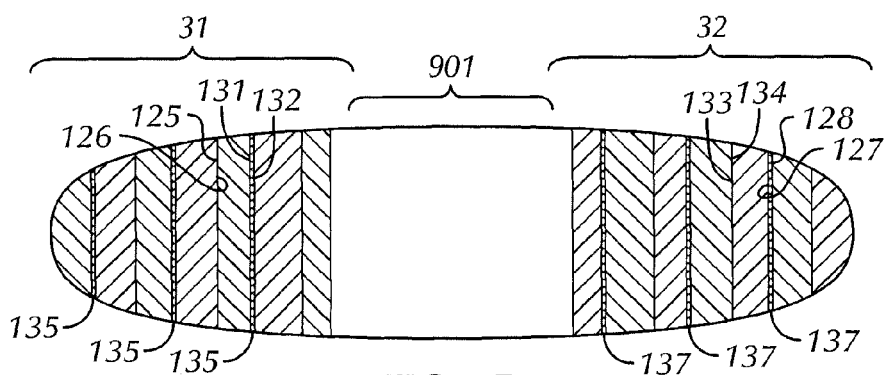

FIGS. 5C and 5D show the reduced pin step-to-step wedge thread connection 400 at a final makeup in accordance with one or more embodiments of the present disclosure. At final makeup, load flanks 125, 126 and stab flanks 131, 132 on the first step 31 and load flanks 127, 128 and stab flanks 133, 134 on the second step 32 are engaged. However, an amount of interference between engaged stab and load flanks differs. On the first step 31, a higher interference 135 (illustrated as overlap) is generated between stab flanks 131, 132 than load flanks 125, 126, while on the second step 32, a higher interference 137 (illustrated as overlap) is generated between load flanks 127, 128 than stab flanks 133, 134, due to the difference in axial separation between steps 31, 32 of the pin member 401 and box member 402. In certain embodiments, on step 31, stab flanks 131, 132 may engage while load flanks 125, 126 may not completely engage or engage at all, while on step 32, load flanks 127, 128 may engage while stab flanks 133, 134 may not completely engage or engage at all.

Methods of making up a reduced pin step-to-step connection include engaging pin wedge threads 406 of pin member 401 with corresponding box wedge threads 407 of box member 402. During makeup, on step 31, corresponding stab flanks 131, 132 may engage prior to corresponding load flanks 125, 126, while on step 32, corresponding load flanks 127, 128 may engage prior to corresponding stab flanks 133, 134. As makeup of the connection continues, interference between stab flanks 131, 132 on the first step 31 and load flanks 127, 128 on second step 32 increases up to a final makeup. At final makeup, load flanks 125, 126 on the first step 31 and stab flanks 133, 134 on the second step 32 also engage. Thus, at final makeup, on the first step 31, a higher interference 135 is generated between stab flanks 131, 132 than load flanks 125, 126, while on the second step 32, a higher interference 137 is generated between load flanks 127, 128 than stab flanks 133, 134.

In one or more embodiments disclosed herein, the threaded connection may be a two-step wedge thread connection having a standard wedge on both steps, i.e., the thread lead on both steps 31, 32 have wedge ratios that are substantially the same. In other embodiments, the threaded connection may have a thread lead on the first step 31 having a first wedge ratio and a thread lead on the second step 32 having a second wedge ratio (i.e., different wedge ratios on each step). As previously described, one of the wedge ratios may be considered to be an "aggressive" wedge ratio and the other a "conservative" wedge ratio ("aggressive" refers to the larger wedge ratio, and "conservative" refers to the smaller wedge ratio). In one or more embodiments disclosed herein, thread leads on one step may have an aggressive wedge ratio of between about 0.035 and 0.045 inches per revolution while the thread leads on the other step may have a conservative wedge ratio of between about 0.003 and 0.010 inches per revolution. In other embodiments, the thread leads on one step may have an aggressive wedge ratio of about 0.019 inches per revolution and the thread leads on the other step may have a conservative wedge ratio of about 0.011 inches per revolution.

Further, the wedge threads on steps 31, 32 of the threaded connection may have a number of different clearance/interference combinations between corresponding roots and crests. For example, in certain embodiments, the threads on one or both steps 31, 32 may have a root/crest clearance at a final makeup. In other embodiments, the threads on one or both steps 31, 32 may have root/crest interference at a final makeup. Still further, in certain embodiments, the threads on the first step 31 may have a root/crest clearance while the threads on the second step 32 have a root/crest interference, or vice versa. Still further, in certain embodiments, the threads on the first step 31 and second step 32 may have alternating root/crest clearance and interference in adjacent threads.

In certain embodiments, the threaded connection may include a vanishing thread form as shown in FIG. 6. FIG. 6 shows a cross-section view of a two-step wedge thread connection 600 having a step-to-step wedge. As shown, the pin member 601 and box member 602 have corresponding steps 31 and 32 with pin and box threads 606, 607 thereon, and a mid-step region 901 therebetween. Further, the box thread 607 has a thread height that diminishes along an axial length of the threads moving away from a distal end of the box member 602. The box thread 607 may be characterized as a vanishing thread form because of the diminishing thread height.

As used herein, "vanishing" threads may be defined as box threads which rather than being "perfect" full form threads, vanish when the thread taper intersects the pipe body surface. Therefore, "vanishing" threads have their crests truncated, thus leaving a radial gap between the thread crests and the thread root of the mating member. The "vanishing" thread concept may enhance both tension and compression capabilities of integral connections when applied to sections of full pipe body wall thickness. It matters not whether the full pipe body wall thickness section occurs in a plain end pipe section or in a swaged pipe body section as long as the outer diameter ("OD") of the section is comprised of pipe body surface (non-machined) and the inner diameter ("ID") of the section is comprised of pipe body surface (non-machined).

In a threaded connection, the tension critical section works off of the thread load flank at the thread root. When a "perfect" full form thread intersects the pipe body surface, the critical section is a function of the pipe body inner and outer surfaces minus the depth of the "perfect" full form thread. When the thread is allowed to "vanish" into the pipe body surface, a thread with less than full thread height is intersecting the pipe body surface. A load flank that is less than fully engaged with the mating member can carry the full tension load applied to the connection. In certain embodiments, approximately 30%-70% thread load flank engagement may carry the full tension load. Therefore, the connection critical section area may be significantly increased by taking advantage of a "vanishing" thread. For wedge threads, compression capacity works off of the thread stab flank at the thread crest. So if the thread form intersects the pipe body surface in a section of the full pipe body wall thickness, whether at a "perfect" thread form height or just partially as in a "vanishing" thread, the compression capacity of the connection is equal to that of the pipe body.

Embodiments disclosed herein for the step-to-step wedge thread connection provide a number of advantages. First, embodiments disclosed herein address dope compound entrapment within the wedge threads, which is an inherent problem in larger diameter wedge products, and subsequent low break-out torques experienced as the thread compound pressure relieves with time, loading, or temperature. Even if individual wedges trap the dope compound, the substantial wedging effect that is created between the two steps of the connection is still sufficient to provide required break-out torque resistance. Thus, dope entrapment is tolerated by the step-to-step wedge such that it is no longer deleterious to the structural integrity of the threaded connection.

Next, embodiments disclosed herein address manufacturing limitations involved with thread machining. Generally, a thread is cut on a tubular using a substantially constant thread lead (including the load lead and the stab lead), however, some variance in the thread lead occurs during the manufacturing process, which is typically includes machining with a mill or lathe. During machining, the variance in the thread lead manifests as a slight periodic variation in the thread lead above and below the intended value for the thread lead. This phenomenon is commonly referred to as "thread drunkenness." The sensitivity of thread drunkenness may be determined as a ratio of the magnitude of the variations or "bumps" in the thread flanks and a width of the wedge thread itself. Previously, the width of the wedge thread was just the distance between opposing thread flanks themselves (i.e., distance between opposing stab and load flanks) Instead, embodiments disclosed herein re-establish a width of the wedge as the distance across the steps of opposing stab and load flanks, thereby increasing the width of the wedge. This effectively reduces the sensitivity of thread drunkenness and thereby reduces or eliminates manufacturing limitations previously caused by thread machining operations.

Still further, embodiments disclosed herein allow the threaded connection to withstand multiple make-ups and break-outs without losing energy retention in the wedge thread. Because of the wedging effect that is created across the two steps, a higher spring effect may be created over a larger distance. This allows the connection to retain energy better and allow for increased energy retention in the wedge over multiple uses. The spring effect also reduces the chances of galling the thread surfaces during make-up of the connection.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A method of making up a threaded connection, the method comprising:
   rotationally engaging a pin member having pin wedge threads with a box member having corresponding box wedge threads, wherein the pin and box wedge threads are formed on corresponding first and second pin and box steps of the pin and box members;
   engaging opposing pin and box stab flanks on the first and second step at different times during makeup of the threaded connection; and
   engaging opposing pin and box load flanks on the first and second step at different times during makeup of the threaded connection.

2. The method of claim 1, further comprising:
   engaging corresponding load flanks before stab flanks on the corresponding first pin and box steps;
   engaging corresponding stab flanks before load flanks on the corresponding second pin and box steps.

3. The method of claim 1, further comprising:
   engaging corresponding stab flanks before load flanks on the corresponding first pin and box steps;
   engaging corresponding load flanks before stab flanks on the corresponding second pin and box steps.

4. The method of claim 1, further comprising engaging corresponding metal sealing surfaces disposed between first and second pin and box steps.

5. A method of making up a threaded connection, the method comprising:
   rotationally engaging a pin member having pin wedge threads with a box member having corresponding box wedge threads, wherein the pin and box wedge threads are formed on corresponding first and second pin and box steps of the pin and box members;
   engaging corresponding load flanks before stab flanks on the corresponding first pin and box steps; and
   engaging corresponding stab flanks before load flanks on the corresponding second pin and box steps.

6. A method of making up a threaded connection, the method comprising:
   rotationally engaging a pin member having pin wedge threads with a box member having corresponding box wedge threads, wherein the pin and box wedge threads are formed on corresponding first and second pin and box steps of the pin and box members;
   engaging corresponding stab flanks before load flanks on the corresponding first pin and box steps; and
   engaging corresponding load flanks before stab flanks on the corresponding second pin and box steps.

* * * * *